US 9,118,438 B2

(12) United States Patent
Miyata (10) Patent No.: US 9,118,438 B2
(45) Date of Patent: Aug. 25, 2015

(54) COMMUNICATION APPARATUS AND COMMUNICATION METHOD (75) Inventor: Takeo Miyata, Daito (JP)

(73) Assignee: KYOCERA Corporation, Kyoto (JP)

( * ) Notice: Subject to any disclaimer, the term of this patent is extended or adjusted under 35 U.S.C. 154(b) by 552 days.

(21) Appl. No.: 13/522,280

(22) PCT Filed: Jan. 13, 2011

(86) PCT No.: PCT/JP2011/050468
§ 371 (c)(1),
(2), (4) Date: Jul. 13, 2012

(87) PCT Pub. No.: WO2011/087065
PCT Pub. Date: Jul. 21, 2011

(65) Prior Publication Data
US 2012/0294176 A1 Nov. 22, 2012

(30) Foreign Application Priority Data
Jan. 15, 2010 (JP) ................................ 2010-007082

(51) Int. Cl.
H04L 12/28 (2006.01)
H04B 7/216 (2006.01)
(Continued)

(52) U.S. Cl.
CPC ............ *H04L 1/0001* (2013.01); *H04B 7/0689* (2013.01); *H04L 1/0016* (2013.01);
(Continued)

(58) Field of Classification Search
CPC ..... H04L 1/001; H04L 1/0016; H04L 1/0026; H04L 1/0643; H04B 7/10; H04B 7/0413; H04B 7/0669; H04B 7/0689; H04B 7/0697
See application file for complete search history.

(56) References Cited

U.S. PATENT DOCUMENTS 6,937,592 B1 * 8/2005 Heath et al. ................... 370/342
6,965,788 B1 * 11/2005 Barratt et al. ................. 455/574
(Continued)

FOREIGN PATENT DOCUMENTS

CN 1969463 A 5/2007
JP H01205636 A 8/1989
(Continued)

OTHER PUBLICATIONS

Notice of Grounds of Rejection dated Aug. 20, 2013, issued in counterpart Japanese Application No. 2010-007082.
(Continued)

Primary Examiner — Steven H Nguyen
(74) Attorney, Agent, or Firm — Procopio, Cory, Hargreaves & Savitch LLP (57) ABSTRACT A communication quality managing unit acquires or calculates a communication quality of a received signal at a different counterpart communication apparatus. A terminal model identifying unit identifies a model of the different counterpart communication apparatus. A switchover table storing unit stores a table, in which a communication quality corresponding to a requirement for switchover of a communication mode is set, for each model of the different counterpart communication apparatus. A switching unit refers to the table on the basis of the communication quality and the model of the different counterpart communication apparatus to switch a setting of a communication mode for a transmitting signal from a non-spatial multiplexing mode to a spatial multiplexing mode or from the spatial multiplexing mode to the non-spatial multiplexing mode. A transmitting unit processes the transmitting signal to output the processed signal to a plurality of antennas, on the basis of the set communication mode.

10 Claims, 7 Drawing Sheets (51) Int. Cl.
  *H04L 1/00*   (2006.01)
  *H04L 1/06*   (2006.01)
  *H04B 7/04*   (2006.01)
  *H04B 7/06*   (2006.01)
  *H04B 7/10*   (2006.01)

(52) U.S. Cl.
  CPC ............ *H04L1/0026* (2013.01); *H04L 1/0643* (2013.01); *H04B 7/0413* (2013.01); *H04B 7/0669* (2013.01); *H04B 7/0697* (2013.01); *H04B 7/10* (2013.01)

(56) References Cited

U.S. PATENT DOCUMENTS

| | | | |
|---|---|---|---|
| 7,024,163 B1* | 4/2006 | Barratt et al. | 455/69 |
| 7,535,969 B2* | 5/2009 | Catreux et al. | 375/267 |
| 7,577,118 B2* | 8/2009 | Haumonte et al. | 370/330 |
| 7,586,873 B2* | 9/2009 | Heath et al. | 370/329 |
| 7,680,206 B2* | 3/2010 | Tujkovic et al. | 375/267 |
| 7,933,340 B2* | 4/2011 | Itoh | 375/259 |
| 7,996,049 B2* | 8/2011 | Barratt et al. | 455/574 |
| 8,000,258 B2* | 8/2011 | Ko et al. | 370/252 |
| 8,126,487 B2* | 2/2012 | Lee et al. | 455/501 |
| 8,160,601 B2* | 4/2012 | Veselinovic et al. | 455/452.2 |
| 8,218,563 B2* | 7/2012 | Khan et al. | 370/437 |
| 8,326,374 B2* | 12/2012 | Barratt et al. | 455/574 |
| 8,345,637 B2* | 1/2013 | Heath et al. | 370/332 |
| 8,428,037 B2* | 4/2013 | Heath et al. | 370/338 |
| 2005/0174981 A1* | 8/2005 | Heath et al. | 370/342 |
| 2006/0128309 A1 | 6/2006 | Dateki et al. | |
| 2007/0008943 A1* | 1/2007 | Grant et al. | 370/342 |
| 2007/0104149 A1* | 5/2007 | Khan et al. | 370/334 |
| 2008/0013504 A1 | 1/2008 | Nishibayashi et al. | |
| 2008/0051129 A1 | 2/2008 | Abe et al. | |
| 2008/0317014 A1* | 12/2008 | Veselinovic et al. | 370/380 |
| 2009/0059844 A1* | 3/2009 | Ko et al. | 370/328 |
| 2009/0186585 A1* | 7/2009 | Ahrony et al. | 455/101 |
| 2009/0213955 A1 | 8/2009 | Higuchi et al. | |
| 2009/0232061 A1* | 9/2009 | Rajamani et al. | 370/329 |
| 2009/0247093 A1 | 10/2009 | Saito | |
| 2010/0014500 A1* | 1/2010 | Lee et al. | 370/342 |
| 2010/0046429 A1* | 2/2010 | Heath et al. | 370/328 |
| 2010/0067401 A1* | 3/2010 | Medvedev et al. | 370/253 |
| 2010/0075672 A1* | 3/2010 | Jwa et al. | 455/434 |
| 2010/0103833 A1* | 4/2010 | Englund et al. | 370/252 |
| 2010/0142636 A1* | 6/2010 | Heath et al. | 375/260 |
| 2010/0202313 A1* | 8/2010 | Barratt et al. | 370/252 |
| 2010/0291918 A1 | 11/2010 | Suzuki et al. | |
| 2010/0317382 A1* | 12/2010 | Lee et al. | 455/501 |
| 2011/0243265 A1 | 10/2011 | Dateki et al. | |
| 2013/0286962 A1* | 10/2013 | Heath et al. | 370/329 |

FOREIGN PATENT DOCUMENTS

| | | |
|---|---|---|
| JP | 2002-058061 A | 2/2002 |
| JP | 2004-072624 A | 3/2004 |
| JP | 2005-094255 A | 4/2005 |
| JP | 2006-173834 A | 6/2006 |
| JP | 2008-022173 A | 1/2008 |
| JP | 2008-236342 A | 10/2008 |
| JP | 2009-021935 A | 1/2009 |
| JP | 2009-038447 A | 2/2009 |
| JP | 2009-253379 A | 10/2009 |
| JP | 2009-273186 A | 11/2009 |
| JP | 2009-542164 A | 11/2009 |
| WO | 2005/122414 A1 | 12/2005 |
| WO | 2006/106613 A1 | 10/2006 |
| WO | 2008/003087 A2 | 1/2008 |
| WO | 2009-091028 A1 | 7/2009 |

OTHER PUBLICATIONS

International Search Report dated Feb. 15, 2011, issued for International Application No. PCT/JP2011/050468.

Notice of Grounds of Rejection dated May 21, 2013, issued in counterpart Japanese Application No. 2010-007082.

Office Action dated Jul. 14, 2014, issued in counterpart Chinese application No. 201180006113.7.

* cited by examiner

| COMMUNICATION LEVEL | MIMO | MCS |
|---|---|---|
| 1 | MATRIX-A | QPSK 1/2 |
| 2 | MATRIX-A | QPSK 3/4 |
| 3 | MATRIX-A | 16QAM 1/2 |
| 4 | MATRIX-A | 16QAM 3/4 |
| 5 | MATRIX-A | 64QAM 1/2 |
| 6 | MATRIX-A | 64QAM 2/3 |
| 7 | MATRIX-A | 64QAM 3/4 |
| 8 | MATRIX-A | 64QAM 5/6 |
| 9 | MATRIX-B | 64QAM 1/2 |
| 10 | MATRIX-B | 64QAM 2/3 |
| 11 | MATRIX-B | 64QAM 3/4 |
| 12 | MATRIX-B | 64QAM 5/6 |

FIG.4

$0 \times \underbrace{A_2 A_1}_{\text{TERMINAL MODEL NUMBER}} \underbrace{B_2 B_1}_{\text{COUNTRY NUMBER}} \underbrace{C_4 C_3 C_2 C_1}_{\text{TELEPHONE NUMBER}}$

COMMUNICATION APPARATUS AND COMMUNICATION METHOD

TECHNICAL FIELD

The present invention relates to a communication apparatus and a communication method. Particularly, the present invention relates to a communication apparatus that allows spatial multiplexing for a transmitting signal, and a communication method for such a communication apparatus.

BACKGROUND ART

In various radio communication systems for WiMAX (Worldwide Interoperability for Microwave Access) (registered trademark), next generation PHS (Personal Handy-Phone System), LTE (Long Term Evolution) and the like, a communication technology in which both of a transmitting side and a receiving side include a plurality of antennas, that is, MIMO (Multiple Input Multiple Output) has been employed for improving throughput and frequency utilization efficiency.

Examples of MIMO to be employed in a downlink communication mode from a radio base station to a radio terminal include an STC (Space-Time Coding) base and an SM (Spatial Multiplex) base (for example, refer to Patent Literature 1 (Japanese Patent Laying-Open No. 2009-273186)).

According to the STC base, the radio base station places (i.e., codes) one signal stream on the basis of a certain rule with regard to time and space (antenna) and transmits the coded signal stream through a plurality of antennas. In WiMAX, this STC base downlink communication mode is called DL MIMO MATRIX-A (hereinafter, simply referred to as MATRIX-A).

On the other hand, according to the SM base, the radio base station multiplex-transmits a plurality of signal streams through a plurality of antennas at a single frequency. In WiMAX, this SM base downlink communication mode is called DL MIMO MATRIX-B (hereinafter, simply referred to as MATRIX-B).

CITATION LIST

Patent Literature

PTL 1: Japanese Patent Laying-Open No. 2009-273186

SUMMARY OF INVENTION

Technical Problem

Depending on conditions of a transmission path, the radio terminal is occasionally improved in throughput characteristic and area characteristic, further, frequency utilization efficiency by employing the MIMO communication mode based on the space-time coding mode (DL MIMO MATRIX-A) which is the non-spatial multiplexing mode or the radio terminal is occasionally improved in throughput characteristic and area characteristic, further, frequency utilization efficiency by employing the MIMO communication mode based on the spatial multiplexing mode (DL MIMO MATRIX-B).

Particularly, radio terminals differ from one another with regard to an array of a plurality of antennas, a polarization plane and a gain, and therefore differ from one another with regard to a spatial correlation characteristic of the plurality of antennas. As the result, there are a radio terminal which succeeds in switchover from a non-spatial multiplexing mode to a spatial multiplexing mode and a radio terminal which does not succeed in the switchover.

Hence, it is an object of the present invention to provide a communication apparatus and a communication method each capable of appropriately performing switchover to a spatial multiplexing mode even in a case where counterpart communication apparatuses differ from one another with regard to an array of a plurality of antennas, a polarization plane and a gain.

Solution to Problem

In order to solve the problems described above, a communication apparatus according to the present invention includes: a plurality of antennas; a quality managing unit for acquiring or calculating a communication quality of a received signal at a different counterpart communication apparatus; an identifying unit for identifying a model of the different counterpart communication apparatus; a storing unit for storing a table, in which the communication quality corresponding to a requirement for switchover of a communication mode is set, for each model of the different counterpart communication apparatus; a switching unit for referring to the table on the basis of the communication quality and the model of the different counterpart communication apparatus to switch a setting of a communication mode for a transmitting signal from a non-spatial multiplexing mode to a spatial multiplexing mode or from the spatial multiplexing mode to the non-spatial multiplexing mode; and a transmitting unit for processing the transmitting signal to output the processed signal to the plurality of antennas on the basis of the set communication mode.

Advantageous Effects of Invention

According to the present invention, it is possible to appropriately perform switchover to a spatial multiplexing mode even in a case where counterpart communication apparatuses differ from one another with regard to an array of a plurality of antennas, a polarization plane and a gain.

BRIEF DESCRIPTION OF DRAWINGS

FIG. 7(a) is a diagram for illustrating an example of an upper limit value of a packet error rate (PER) in a case of level-up by one step in a switchover table in which a terminal model is "A". FIG. 7(b) is a diagram for illustrating an example of the upper limit value of the packet error rate (PER)

in a case of level-up by one step in a switchover table in which a terminal model is "B". FIG. 7(c) is a diagram for illustrating an example of the upper limit value of the packet error rate (PER) in a case of level-up by one step in a switchover table in which a terminal model is "C". FIG. 7(d) is a diagram for illustrating an example of the upper limit value of the packet error rate (PER) in a case of level-up by one step in a special switchover table in which a terminal model does not fit into the predetermined model. FIG. 7(e) is a diagram for illustrating an example of a lower limit value of the packet error rate (PER) in a case of level-down by one step in the switchover table in which the terminal model is "A". FIG. 7(f) is a diagram for illustrating an example of the lower limit value of the packet error rate (PER) in a case of level-down by one step in the switchover table in which the terminal model is "B". FIG. 7(g) is a diagram for illustrating an example of the lower limit value of the packet error rate (PER) in a case of level-down by one step in the switchover table in which the terminal model is "C". FIG. 7(h) is a diagram for illustrating an example of the lower limit value of the packet error rate (PER) in a case of level-down by one step in the special switchover table in which the terminal model does not fit into the predetermined model.

DESCRIPTION OF EMBODIMENTS

Hereinafter, embodiments of the present invention will be described with reference to the drawings.

[First Embodiment]

Figure 1:
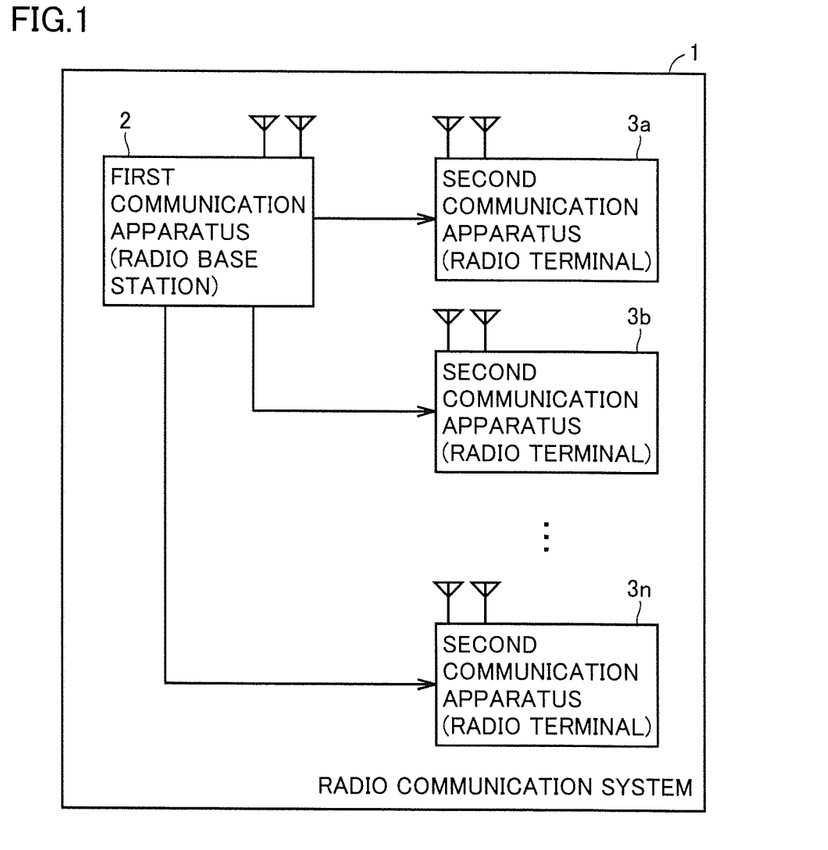
FIG. 1 is a diagram showing a radio communication system according to one embodiment of the present invention.

FIG. 1 is a diagram showing a radio communication system according to one embodiment of the present invention.

With reference to FIG. 1, the radio communication system has a first communication apparatus 2, and "n" second communication apparatuses 3a to 3n. A downlink signal of user data is transmitted between first communication apparatus 2 and "n" second communication apparatuses 3a to 3n in accordance with an MIMO communication mode based on a space-time coding mode (DL MIMO MATRIX-A) or an MIMO communication mode based on a spatial multiplexing mode (DL MIMO MATRIX-B). Hereinafter, a second communication apparatus denoted with reference sign 3 represents one of second communication apparatuses 3a to 3n.

First communication apparatus 2 may be, for example, a radio base station, and each of second communication apparatuses 3a to 3n may be, for example, a radio terminal. The radio base station allows simultaneous communication with plural ones of the "n" radio terminals.

(Configuration of Radio Base Station)

Figure 2:
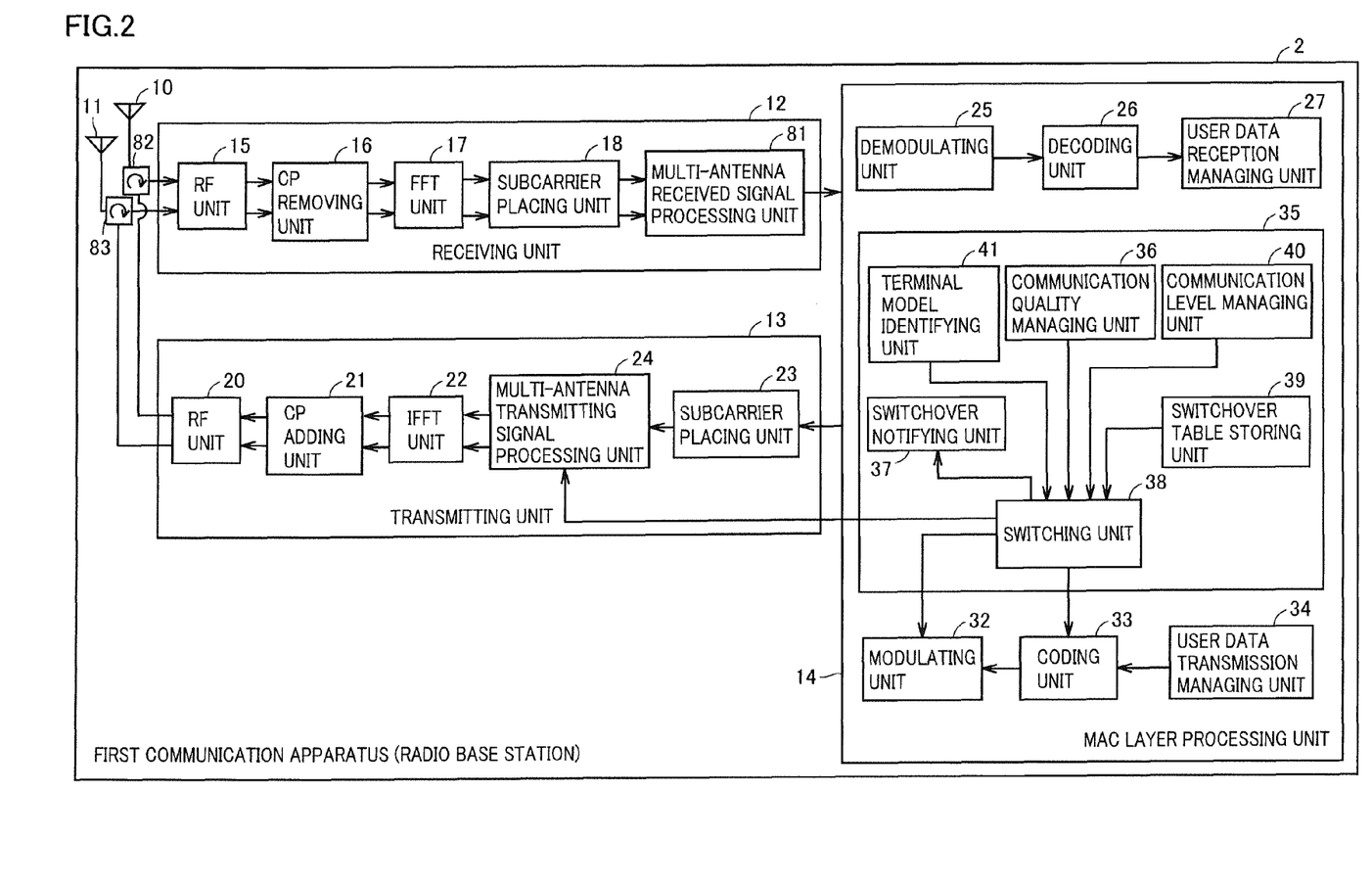
FIG. 2 is a diagram showing a configuration of a radio base station according to a first embodiment.

FIG. 2 is a diagram showing a configuration of the radio base station according to a first embodiment.

With reference to FIG. 2, radio base station 2 includes a first antenna 10, a second antenna 11, a transmitting unit 13, a receiving unit 12, an MAC (Media Access Control) layer processing unit 14, a first coupler/distributor 82 and a second coupler/distributor 83.

First coupler/distributor 82 is configured with, for example, a circulator, outputs a signal from transmitting unit 13 to first antenna 10, and outputs a signal from first antenna 10 to receiving unit 12.

Second coupler/distributor 83 is configured with, for example, a circulator, outputs a signal from transmitting unit 13 to second antenna 11, and outputs a signal from second antenna 11 to receiving unit 12.

Transmitting unit 13 includes a multi-antenna transmitting signal processing unit 24, a subcarrier placing unit 23, an IFFT (Inverse First Fourier Transform) unit 22, a CP (Cyclic Prefix) adding unit 21 and an RF (Radio Frequency) unit 20.

Subcarrier placing unit 23 places a subcarrier on the basis of, for example, PUSC (Partial Usage of Subchannels).

Multi-antenna transmitting signal processing unit 24 performs space-time coding (e.g., Alamouti coding) on one data stream in a case where a set MIMO communication mode is MATRIX-A, and performs spatial multiplexing on a plurality of data streams in a case where the set MIMO communication mode is MATRIX-B.

IFFT unit 22 transforms a plurality of subcarrier signals (frequency domain signals) to be output from multi-antenna transmitting signal processing unit 24 to time domain signals (OFDMA (Orthogonal Frequency Division Multiple Access) symbols) by IFFT.

CP adding unit 21 adds, as a CP, the same signal as a trailing end of an OFDMA symbol to a leading end of the OFDMA symbol.

RF unit 20 includes an upconverter for up-converting a signal into a radio frequency band, a power amplifier circuit for amplifying the up-converted signal, a band-pass filter for passing only a signal component, in a desired band, of the amplified signal and then outputting the signal component to first antenna 10 and second antenna 11, and the like.

Receiving unit 12 includes an RF unit 15, a CP removing unit 16, an FFT unit 17, a subcarrier placing unit 18 and a multi-antenna received signal processing unit 81.

RF unit 15 includes a band-pass filter for passing only a signal component, in a desired band, of a signal to be output from first antenna 10 and second antenna 11, a low noise amplifier circuit for amplifying an RF signal, a downconverter for down-converting an RF signal, and the like.

CP removing unit 16 removes a CP from a signal to be output from RF unit 15.

FFT unit 17 transforms a time domain signal to be output from CP removing unit 16 to a frequency domain signal by FFT to demodulate the signal into a plurality of subcarriers.

Subcarrier placing unit 18 extracts each subcarrier to be output from FFT unit 17, on the basis of, for example, PUSC.

Multi-antenna received signal processing unit 81 performs adaptive array reception processing on a signal to be output from, for example, subcarrier placing unit 18.

MAC layer processing unit 14 includes a user data transmission managing unit 34, a coding unit 33, a modulating unit 32, a demodulating unit 25, a decoding unit 26, a user data reception managing unit 27 and a controller unit 35.

User data transmission managing unit 34 manages user data to be transmitted to radio terminal 3.

Coding unit 33 codes a downlink signal in accordance with a coding rate of an MCS (Modulation and Code Scheme) to be instructed by switching unit 38.

Modulating unit 32 modulates a coded downlink signal to be transmitted to radio terminal 3, in accordance with a modulation mode of an MCS to be instructed by switching unit 38.

Demodulating unit 25 demodulates an uplink signal from radio terminal 3.

Decoding unit 26 decodes a demodulated uplink signal.

User data reception managing unit 27 manages user data received from radio terminal 3.

Controller unit 35 includes a communication quality managing unit 36, a communication level managing unit 40, a terminal model identifying unit 41, a switchover table storing unit 39, a switching unit 38 and a switchover notifying unit 37.

Communication quality managing unit 36 receives, from each radio terminal 3, a notification about a CINR (Carrier to Interference and Noise Ratio) of a measured downlink signal, and stores the notified carrier to interference and noise ratio (CINR).

Communication level managing unit 40 manages a communication level of a current downlink signal.

Figure 3:
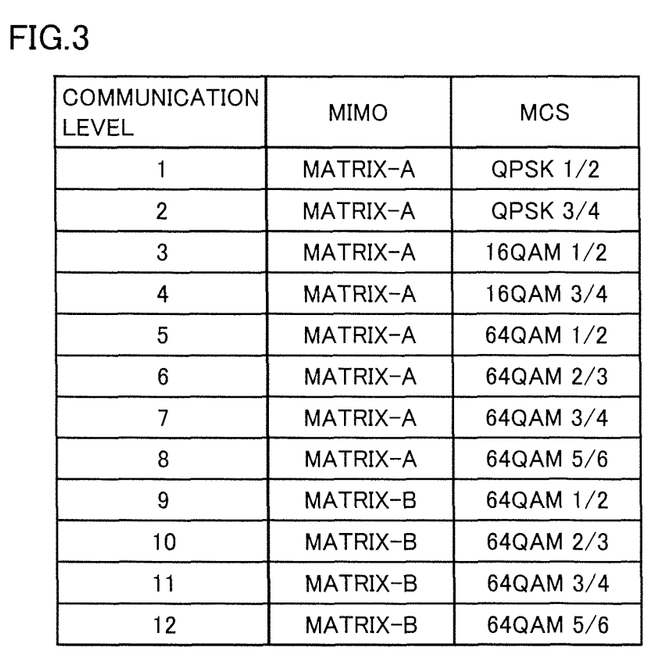
FIG. 3 is a diagram for illustrating a communication level.

FIG. 3 is a diagram for illustrating the communication level.

With reference to FIG. 3, the communication level is set on the basis of an MIMO communication mode and an MCS.

For example, in a case where the communication level is "1", the MIMO communication mode is "MATRIX-A" and the MCS is "QPSK ½". In a case where the communication level is "9", the MIMO communication mode is "MATRIX-B" and the MCS is "64QAM ½".

A case where the value of the communication level increases represents "the communication level is raised" in this description, and a case where the value of the communication level decreases represents "the communication level is lowered" in this description. Moreover, with regard to an identical MIMO communication mode, a case where the MCS is changed to have a high data rate represents "the level of the MCS is raised" in this description, and a case where the MCS is changed to have a low data rate represents "the level of the MCS is lowered" in this description.

Terminal model identifying unit 41 identifies a model of the radio terminal on the basis of part of bits out of a plurality of bits constituting a terminal ID contained in an uplink signal to be transmitted from a radio terminal apparatus.

Figure 4:
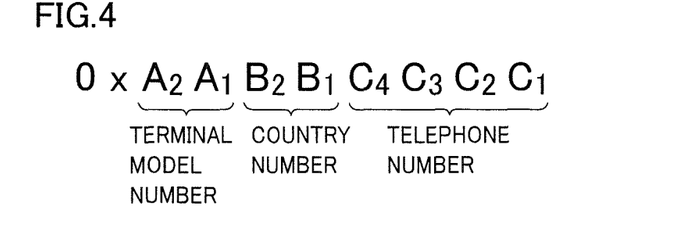
FIG. 4 is a diagram showing a terminal ID of a radio terminal.

FIG. 4 is a diagram showing the terminal ID of the radio terminal.

As shown in FIG. 4, the terminal ID includes the bits $(A_2A_1)$ indicating a terminal model number, the bits $(B_2B_1)$ indicating a country number, and the bits $(C_4C_3C_2C_1)$ indicating a telephone number. Terminal model identifying unit 41 identifies the terminal model on the basis of the bit $(A_2A_1)$ constituting the terminal ID.

Switchover table storing unit 39 sets a requirement for a CINR in a case of changing a communication level, for each model of the radio terminal.

Figure 5:
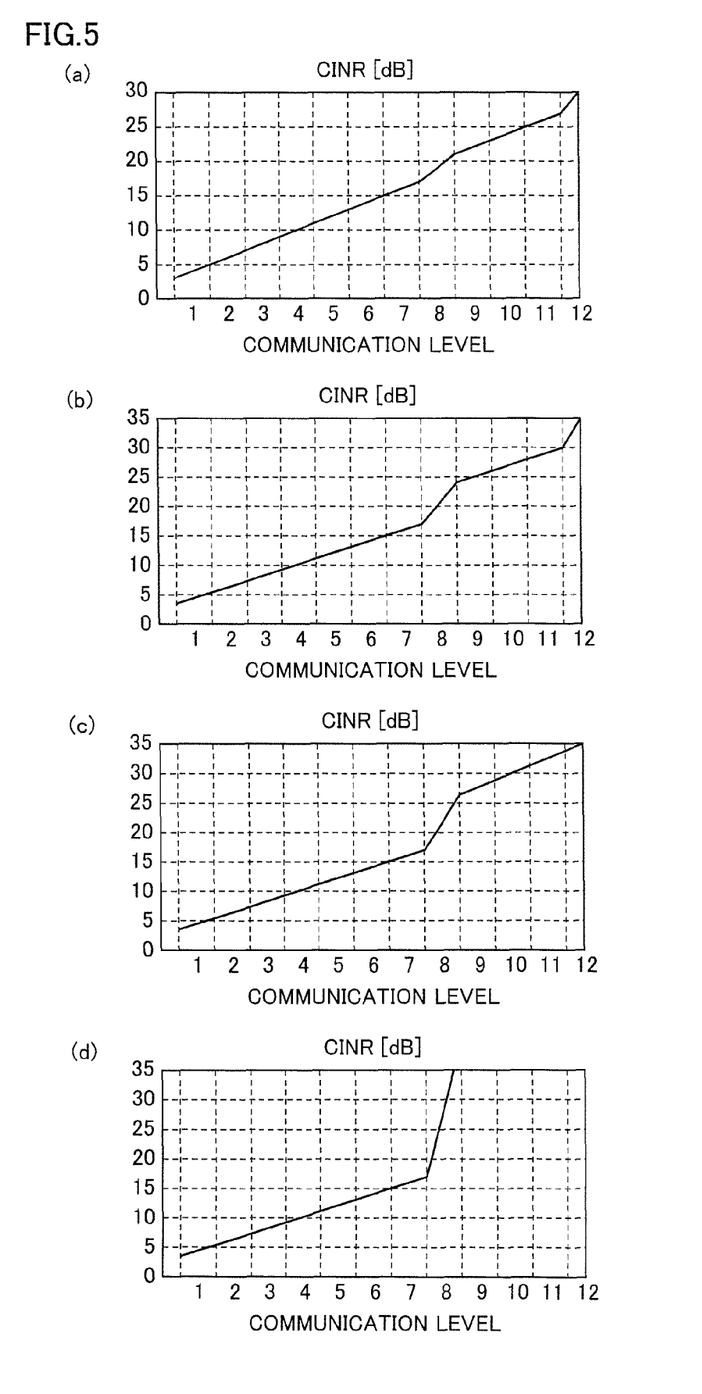
FIG. 5(a) is a diagram for illustrating an example of a switchover table in a case where a terminal model is "A".
FIG. 5(b) is a diagram for illustrating an example of the switchover table in which the terminal model is "B".
FIG. 5(c) is a diagram for illustrating an example of the switchover table in which the terminal model is "C".
FIG. 5(d) is a diagram for illustrating an example of a special switchover table in which the terminal model does not fit into a predetermined model.

FIG. 5(a) is a diagram for illustrating an example of a switchover table in which the terminal model is "A". This switchover table is a standard table which is obtained from results of simulation or laboratory test using a typical propagation path model specified in a WiMAX forum.

FIG. 5(b) is a diagram for illustrating an example of the switchover table in which the terminal model is "B". This table is higher than the standard table in FIG. 5(a) by "+3 dB" with regard to a threshold value of a CINR for switchover to MATRIX-B.

FIG. 5(c) is a diagram for illustrating an example of the switchover table in which the terminal model is "C". This table is higher than the standard table in FIG. 5(a) by "+6 dB" with regard to the threshold value of the CINR for the switchover to MATRIX-B.

FIG. 5(d) is a diagram for illustrating an example of a special switchover table in which the terminal model does not fit into a predetermined model. This table is higher than the standard table in FIG. 5(a) by "+99 dB", and the threshold value of the CINR is strictly set for substantially prohibiting the switchover to MATRIX-B.

Switching unit 38 performs switchover of a communication level, that is, switches between an MIMO communication mode and an MCS (a modulation mode and a coding rate) of a downlink signal in accordance with the switchover table for each terminal model in switchover table storing unit 39.

For example, in the terminal model of "A" (FIG. 5(a)), in a case where a carrier to interference and noise ratio (CINR) of a downlink signal is "equal to or more than 11 but less than 13", switching unit 38 changes the communication level to "5" irrespective of the current communication level. Moreover, in the case where the carrier to interference and noise ratio (CINR) is "equal to or more than 27", switching unit 38 changes the communication level to "12" irrespective of the current communication level.

Switchover notifying unit 37 outputs a signal indicating a notification about an MIMO communication mode and an MCS of a downlink signal to the radio terminal having the communication level switched by switching unit 38.

(Operation)

Figure 6:
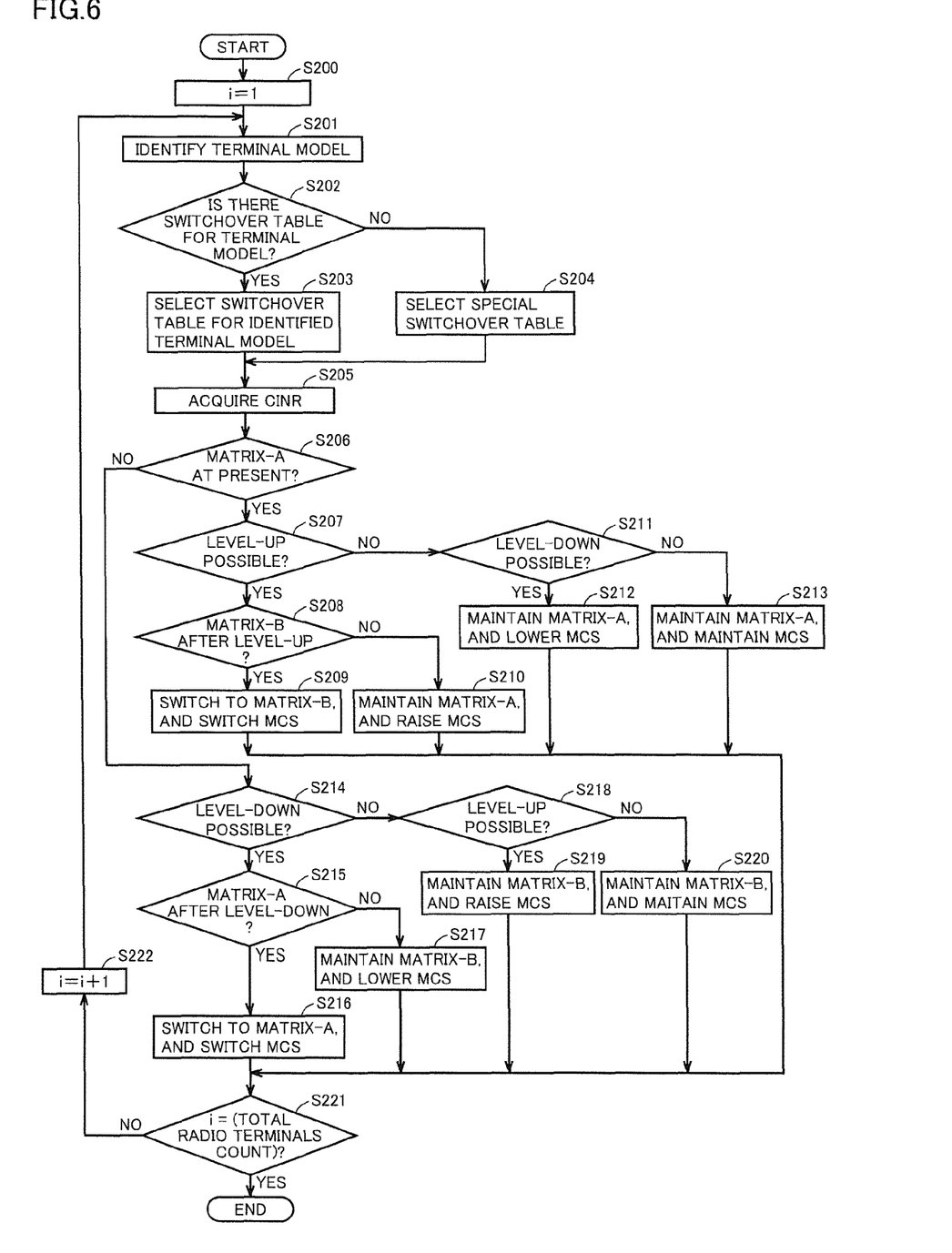
FIG. 6 is a flowchart showing a procedure of an operation to be performed every one frame by the radio base station according to the first embodiment.

FIG. 6 is a flowchart showing a procedure of an operation to be performed every one frame by the radio base station according to the first embodiment.

With reference to FIG. 6, switching unit 38 sets a user number i to 1 (step S200).

Next, terminal model identifying unit 41 identifies a terminal model on the basis of a terminal ID contained in an uplink signal received from the radio terminal having the user number i (step S201).

Next, in a case where there is a switchover table for the identified terminal model (YES in step S202), switching unit 38 selects the switchover table for the identified terminal model (step S203).

On the other hand, in a case where there is no switchover table for the identified terminal model (NO in step S202), switching unit 38 selects the special switchover table (step S204).

Next, communication quality managing unit 36 acquires a carrier to interference and noise ratio (CINR) of a downlink signal from radio terminal 3 of a user i in an uplink frame (step S205).

In a case where an MIMO communication mode at a current communication level is MATRIX-A (YES in step S206), a communication level of the radio terminal having the user number i can be raised in the selected switchover table (i.e., an acquired CINR is larger than the range of a CINR at the current communication level) (YES in step S207) and the MIMO communication mode at the communication level raised in the selected switchover table is MATRIX-B (YES in step S208), switching unit 38 raises the communication level. That is, switching unit 38 switches the MIMO communication mode to MATRIX-B, and also switches an MCS on the basis of the selected switchover table (step S209).

On the other hand, in a case where the MIMO communication mode at the current communication level is MATRIX-A (YES in step S206) and the communication level of the radio terminal having the user number i can be lowered in the selected switchover table (i.e., the acquired CINR is smaller than the range of the CINR at the current communication level) (NO in step S207, YES in step S211), switching unit 38 lowers the communication level. That is, switching unit 38 maintains the MIMO communication mode at MATRIX-A, and lowers the MCS on the basis of the selected switchover table (step S212).

On the other hand, in a case where the MIMO communication mode at the current communication level is MATRIX-A (YES in step S206) and the communication level of the radio terminal having the user number i can be lowered in the selected switchover table (i.e., the acquired CINR is smaller than the range of the CINR at the current communication level) (NO in step S207, YES in step S211), switching unit 38 lowers the communication level. That is, switching unit 38 maintains the MIMO communication mode at MATRIX-A, and lowers the MCS on the basis of the selected switchover table (step S112).

On the other hand, in a case where the MIMO communication mode at the current communication level is MATRIX-A (YES in step S206) and the communication level of the radio terminal having the user number i cannot be raised and lowered in the selected switchover table (NO in step S211), switching unit 38 maintains the communication level. That is, switching unit 38 maintains the MIMO communication mode at MATRIX-A, and maintains the MCS (step S213).

On the other hand, in a case where the MIMO communication mode at the current communication level is MATRIX-B (NO in step S206), the communication level of the radio terminal having the user number i can be lowered in the selected switchover table (i.e., the acquired CINR is smaller than the range of the CINR at the current communication level) (YES in step S214) and the MIMO communication mode at the communication level lowered in the selected switchover table is MATRIX-A (YES in step S215), switching unit 38 lowers the communication level. That is, switching unit 38 switches the MIMO communication mode to MATRIX-A, and also switches the MCS on the basis of the selected switchover table (step S216).

On the other hand, in a case where the MIMO communication mode at the current communication level is MATRIX-B (NO in step S206), the communication level of the radio terminal having the user number i can be lowered in the selected switchover table (YES in step S214) and the MIMO communication mode at the communication level lowered in the selected switchover table is MATRIX-B (NO in step S215), switching unit 38 lowers the communication level. That is, switching unit 38 maintains the MIMO communication mode at MATRIX-B, and lowers the MCS on the basis of the selected switchover table (step S217).

On the other hand, in a case where the MIMO communication mode at the current communication level is MATRIX-B (NO in step S206) and the communication level of the radio terminal having the user number i can be raised in the selected switchover table (i.e., the acquired CINR is larger than the range of the CINR at the current communication level) (NO in step S214, YES in step S218), switching unit 38 raises the communication level. That is, switching unit 38 maintains the MIMO communication mode at MATRIX-B, and raises the MCS on the basis of the selected switchover table (step S219).

On the other hand, in a case where the MIMO communication mode at the current communication level is MATRIX-B (NO in step S206) and the communication level of the radio terminal having the user number i cannot be raised and lowered in the selected switchover table (NO in step S218), switching unit 38 maintains the communication level. That is, switching unit 38 maintains the MIMO communication mode at MATRIX-B, and also maintains the MCS (step S220).

Next, in a case where the user number i is not equal to the number of all users being in communication (NO in step S221), switching unit 38 increments the user number i by 1 (step S222), and then the program returns to step S201.

As described above, according to the first embodiment, the switchover to MATRIX-B is performed by using the switchover table in which the correspondence between the carrier to interference and noise ratio (CINR) and the communication level is set for each model of the radio terminal. Therefore, it is possible to appropriately perform the switchover to MATRIX-B even in the case where the radio terminals differ from one another with regard to an array of a plurality of antennas, a polarization plane and a gain.

[Second Embodiment]
(Configuration)

A radio base station according to a second embodiment is different from the radio base station according to the first embodiment in the following points.

A communication quality managing unit 36 receives, from each radio terminal 3, a notification about a packet error rate (PER) of a measured downlink signal, and then stores the notified packet error rate (PER).

A switchover table storing unit 39 sets an upper limit value of a packet error rate (PER) in a case of raising a communication level by one step and a lower limit value of a packet error PER in a case of lowering the communication level by one step, for each model of the radio terminal, in correspondence with each communication level.

Figure 7:
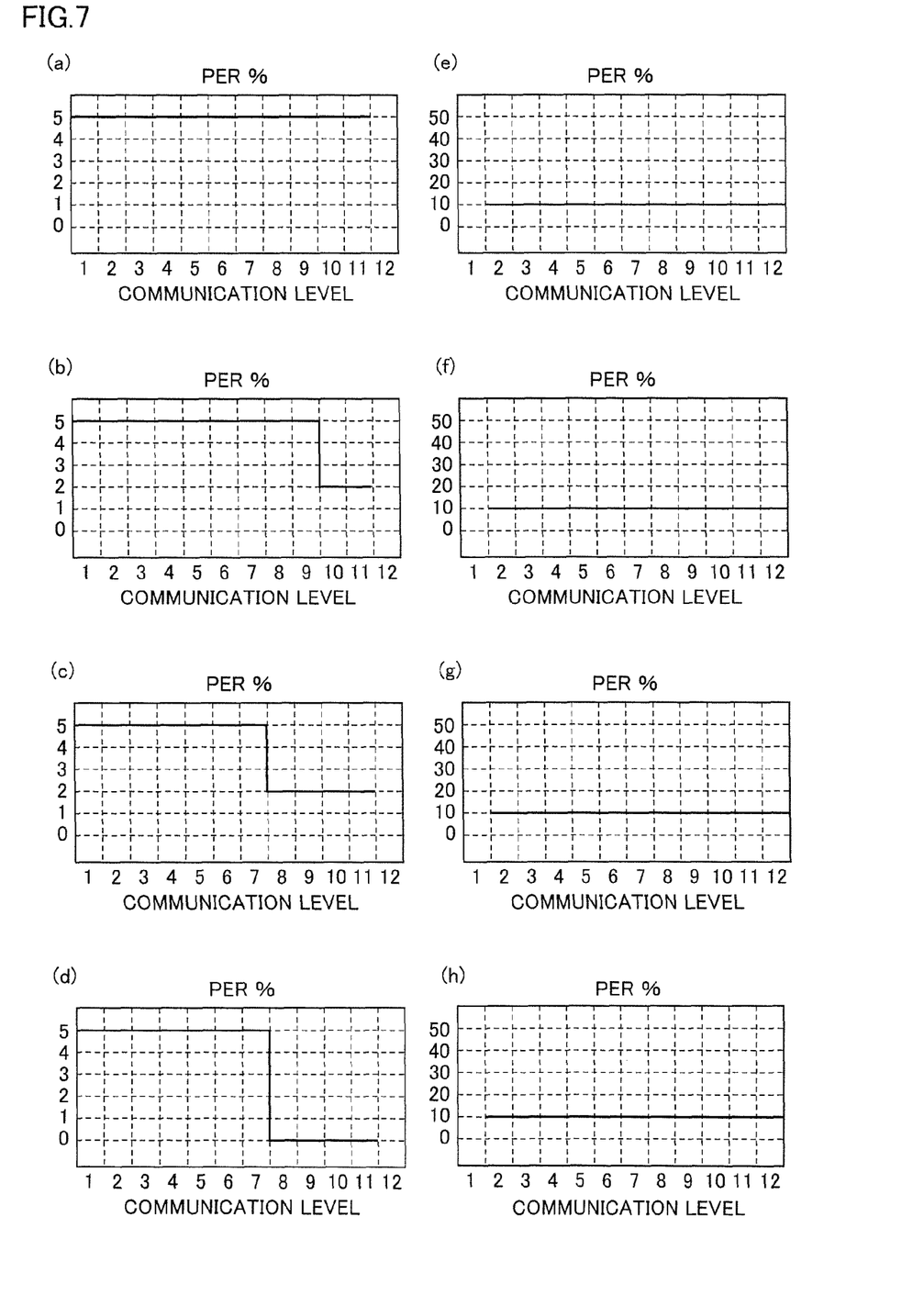

FIG. 7(a) is a diagram for illustrating an example of the upper limit value of the packet error rate (PER) in a case of level-up by one step in a switchover table in which a terminal model is "A". FIG. 7(a) shows the upper limit value of the packet error rate (PER) in a case of level-up by one step in a standard switchover table which is obtained from results of simulation or laboratory test using a typical propagation path model specified in a WiMAX forum.

FIG. 7(b) is a diagram for illustrating an example of the upper limit value of the packet error rate (PER) in a case of level-up by one step in a switchover table in which a terminal model is "B". As shown in FIG. 7(b), the upper limit value of the packet error rate (PER) in the case of raising the communication level by one step is lower than that in the standard table shown in FIG. 7(a) by "3%" with regard to the communication levels "10" and "11" in MATRIX-B. In other words, a requirement for level-up is further strictly set as compared with FIG. 7(a) with regard to the communication levels "10" and "11".

FIG. 7(c) is a diagram for illustrating an example of the upper limit value of the packet error rate (PER) in a case of level-up by one step in a switchover table in which a terminal model is "C". As shown in FIG. 7(c), the upper limit value of the packet error rate (PER) in the case of raising the communication level by one step is lower than that in the standard table shown in FIG. 7(a) by "3%" with regard to the communication level "8" in MATRIX-A and the communication levels "9", "10" and "11" in MATRIX-B. In other words, a requirement for level-up is further strictly set as compared with FIG. 7(a) with regard to the communication levels "8" to "11".

FIG. 7(d) is a diagram for illustrating an example of the upper limit value of the packet error rate (PER) in a case of level-up by one step in a special switchover table in which a terminal model does not fit into a predetermined model. In FIG. 7(d), the upper limit value of the packet error rate (PER) is strictly set to completely prohibit switchover to MATRIX-B.

FIG. 7(e) is a diagram for illustrating an example of the lower limit value of the packet error rate (PER) in a case of level-down by one step in the switchover table in which the terminal model is "A".

FIG. 7(f) is a diagram for illustrating an example of the lower limit value of the packet error rate (PER) in a case of level-down by one step in the switchover table in which the terminal model is "B".

FIG. 7(g) is a diagram for illustrating an example of the lower limit value of the packet error rate (PER) in a case of level-down by one step in the switchover table in which the terminal model is "C".

FIG. 7(h) is a diagram for illustrating an example of the lower limit value of the packet error rate (PER) in a case of level-down by one step in the special switchover table in which the terminal model does not fit into the predetermined model.

As shown in FIGS. 7(e) to 7(f), the lower limit value of the packet error rate (PER) in the case of level-down by one step is "10%" irrespective of the terminal model and the current communication level.

Switching unit 38 performs switchover of a communication level, that is, switches between an MIMO communication mode and an MCS (a modulation mode and a coding rate) of a downlink signal in accordance with the switchover table for each terminal model in switchover table storing unit 39.

For example, with regard to the terminal model of "C" (FIGS. 7(c), 7(g)), in a case where a packet error rate (PER) of a downlink signal is "equal to or less than 2%" while the current communication level is "8" (MATRIX-A, 64QAM ⅚), switching unit 38 raises the communication level to "9", that is, switches the MIMO communication mode of the downlink signal to MATRIX-B and also switches the MCS to "64QAM ½". In a case where the packet error rate (PER) of the downlink signal is "equal to or more than 10%" while the current communication level is "8" (MATRIX-A, 64QAM ⅚), switching unit 38 lowers the communication level to "7", that is, maintains the MIMO communication mode of the downlink signal at MATRIX-A and lowers the MCS to "64QAM ¾".

(Operation)

Figure 8:
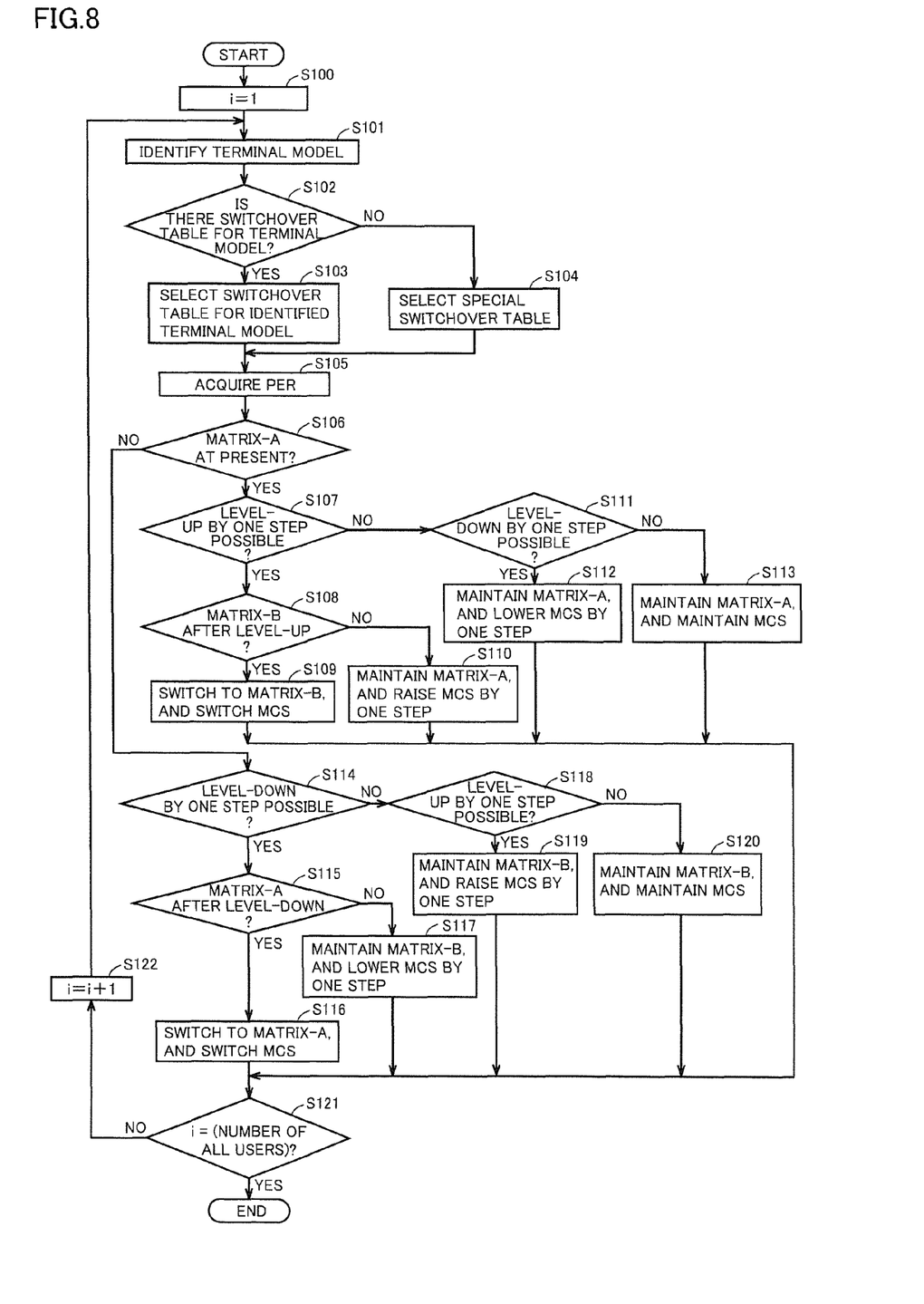
FIG. 8 is a flowchart showing a procedure of an operation to be performed every one frame by a radio base station according to a second embodiment.

FIG. 8 is a flowchart showing a procedure of an operation to be performed every one frame by the radio base station according to the second embodiment.

With reference to FIG. 8, switching unit 38 sets a user number i to 1 (step S100).

Next, a terminal model identifying unit 41 identifies a terminal model on the basis of a terminal ID contained in an uplink signal received from the radio terminal having the user number i (step S101).

Next, in a case where there is a switchover table for the identified terminal model (YES in step S102), switching unit 38 selects the switchover table for the identified terminal model (step S103).

On the other hand, in a case where there is no switchover table for the identified terminal model (NO in step S102), switching unit 38 selects the special switchover table (step S104).

Next, a communication quality managing unit 36 acquires a packet error rate (PER) of a downlink signal from a radio terminal 3 of a user i in an uplink frame (step S105).

In a case where a MIMO communication mode at a current communication level is MATRIX-A (YES in step S106), the communication level of the radio terminal having the user number i can be raised by one step in the selected switchover table (i.e., the acquired packet error rate (PER) is equal to or less than an upper limit value of a packet error rate (PER) at the current communication level set in the selected switchover table) (YES in step S107) and the MIMO communication mode at the communication level raised by one step in the selected switchover table is MATRIX-B (YES in step S108), switching unit 38 raises the communication level by one step. That is, switching unit 38 switches the MIMO communication mode at MATRIX-B, and also switches an MCS on the basis of the selected switchover table (step S109).

On the other hand, in a case where the MIMO communication mode at the current communication level is MATRIX-A (YES in step S106), the communication level of the radio terminal having the user number i can be raised by one step in the selected switchover table (YES in step S107) and the MIMO communication mode at the communication level raised by one step in the selected switchover table is MATRIX-A (NO in step S108), switching unit 38 raises the communication level by one step. That is, switching unit 38 maintains the MIMO communication mode at MATRIX-A, and raises the MCS by one step on the basis of the selected switchover table (step S110).

On the other hand, in a case where the MIMO communication mode at the current communication level is MATRIX-A (YES in step S106) and the communication level of the radio terminal having the user number i can be lowered by one step in the selected switchover table (i.e., the acquired packet error rate (PER) is equal to or more than the lower limit value of the packet error rate (PER) at the current communication level set in the selected switchover table) (NO in step S107, YES in step S111), switching unit 38 lowers the communication level by one step. That is, switching unit 38 maintains the MIMO communication mode at MATRIX-A, and lowers the MCS by one step on the basis of the selected switchover table (step S112).

On the other hand, in a case where the MIMO communication mode at the current communication level is MATRIX-A (YES in step S106) and the communication level of the radio terminal having the user number i cannot be raised and lowered by one step in the selected switchover table (NO in step S111), switching unit 38 maintains the communication level. That is, switching unit 38 maintains the MIMO communication mode at MATRIX-A, and also maintains the MCS (step S113).

On the other hand, in a case where the MIMO communication mode at the current communication level is MATRIX-B (NO in step S106), the communication level of the radio terminal having the user number i can be lowered by one step in the selected switchover table (i.e., the acquired packet error rate (PER) is equal to or more than the lower limit value of the packet error rate (PER) at the current communication level set in the selected switchover table) (YES in step S114) and the MIMO communication mode at the communication level lowered by one step in the selected switchover table is MATRIX-A (YES in step S115), switching unit 38 lowers the communication level by one step. That is, switching unit 38 switches the MIMO communication mode to MATRIX-A, and also switches the MCS on the basis of the selected switchover table (step S116).

On the other hand, in a case where the MIMO communication mode at the current communication level is MATRIX-B (NO in step S106), the communication level of the radio terminal having the user number i can be lowered by one step in the selected switchover table (YES in step S114) and the MIMO communication mode at the communication level lowered by one step in the selected switchover table is MATRIX-B (NO in step S115), switching unit 38 lowers the communication level by one step. That is, switching unit 38 maintains the MIMO communication mode at MATRIX-B, and lowers the MCS by one step on the basis of the selected switchover table (step S117).

On the other hand, in a case where the MIMO communication mode at the current communication level is MATRIX-B (NO in step S106) and the communication level of the radio terminal having the user number i can be raised by one step in the selected switchover table (i.e., the acquired packet error rate (PER) is equal to or less than the upper limit value of the packet error rate (PER) at the current communication level set in the selected switchover table) (NO in step S114, YES in step S118), switching unit 38 raises the communication level by one step. That is, switching unit 38 maintains the MIMO communication mode at MATRIX-B, and raises the MCS by one step on the basis of the selected switchover table (step S119).

On the other hand, in a case where the MIMO communication mode at the current communication level is MATRIX-B (NO in step S106) and the communication level of the radio terminal having the user number i cannot be raised and lowered by one step in the selected switchover table (NO in step S118), switching unit 38 maintains the communication level. That is, switching unit 38 maintains the MIMO communication mode at MATRIX-B, and also maintains the MCS (step S120).

Next, in a case where the user number i is not equal to the number of all users being in communication (NO in step S121), switching unit 38 increments the user number i by 1 (step S122), and then the program returns to step S 101.

As described above, according to the second embodiment, the switchover to MATRIX-B is performed by using the switchover table in which the correspondence between the packet error rate (PER) and the communication level is set for each model of the radio terminal. Therefore, it is possible to appropriately perform the switchover to MATRIX-B even in the case where the radio terminals differ from one another with regard to an array of a plurality of antennas, a polarization plane and a gain.

MODIFICATION EXAMPLES

The present invention is not limited to the foregoing embodiments, but may involve the following modification examples.

(1) Switchover Table According to the First Embodiment

In the first embodiment of the present invention, the switching unit performs the switchover to the communication level corresponding to the carrier to interference and noise ratio (CINR) of the measured downlink signal, irrespective of the current communication level; however, the present invention is not limited thereto. For example, the switching unit may raise the communication level by one step in a case where the measured carrier to interference and noise ratio (CINR) exceeds the range of the carrier to interference and noise ratio (CINR) corresponding to the current communication level, and may lower the communication level by one step in a case where the measured carrier to interference and noise ratio (CINR) is less than the range of the carrier to interference and noise ratio (CINR) corresponding to the current communication level.

(2) Special Switchover Table

In the first embodiment of the present invention, the switchover to MATRIX-B is substantially prohibited in the special switchover table. However, the switchover may be completely prohibited in the special switchover table as described in the second embodiment.

In the special table, moreover, the switchover to MATRIX-B is not prohibited, but the requirement for the switchover to MATRIX-B may be further restricted as compared with the normal table. Alternatively, the special table may be similar to the table for any one of the terminal models (the table in which the terminal model is "A", "B" or "C" in the embodiments).

(3) Update of Switchover Table

In the embodiments of the present invention, the requirement for the communication quality in the switchover table is fixed; however, the present invention is not limited thereto. For example, this requirement may be changed. For example, in a case where a success rate of raising the communication level is high, that is, in a case where the communication level is not lowered again in a short time after the communication level is raised, the requirement for the communication quality for raising the communication level may be changed so as to be loosened.

(4) Terminal Model

In the embodiments of the present invention, the terminal ID contains the number indicating the model of the terminal; however, the present invention is not limited thereto. The terminal ID does not contain the number indicating the model of the terminal, but the radio base station may include a table in which the terminal ID is correlated with the model of the terminal.

(5) Non-spatial Multiplexing Mode/Spatial Multiplexing Mode

In the embodiments of the present invention, the description is given of the switchover from the non-spatial multiplexing mode (DL MIMO MATRIX-A) to the spatial multiplexing mode (DL MIMO MATRIX-B) in the communication system for WiMAX; however, the present invention is not limited thereto. The present invention may also be applicable to switchover from a non-spatial multiplexing mode to a spatial multiplexing mode in a different communication system.

(6) Communication Quality of Downlink Signal

In the embodiments of the present invention, the communication quality (PER, CINR) of the downlink signal is transmitted from the radio terminal to the radio base station in the uplink frame; however, the present invention is not limited thereto. For example, the communication quality of the downlink signal may be calculated on the basis of an NACK (Negative ACKnowledgement) signal in a case of ARQ (Automatic Repeat Request) or HARQ (Hybrid Automatic Repeat Request) processing on the side of the radio base station.

It is to be understood that the disclosed embodiments are only illustrative and not restrictive in all respects. The scope of the present invention is interpreted by the appended claims rather than the foregoing description, and it is intended that all kinds of variations are contained in a meaning and a range equivalent to the claims.

Reference Signs List

1 Radio communication system, 2 First communication apparatus (radio base station), 3, 3a to 3n Second communication apparatus (radio terminal), 10, 11 Antenna, 13 Transmitting unit, 12 Receiving unit, 14 MAC layer processing unit, 15, 20 RF unit, 16 CP removing unit, 17 FFT unit, 18, 23 Subcarrier placing unit, 21 CP adding unit, 22 IFFT unit, 24 Multi-antenna transmitting signal processing unit, 25 Demodulating unit, 26 Decoding unit, 27 User data reception managing unit, 32 Modulating unit, 33 Coding unit, 34 User data transmission managing unit, 35 Controller unit, 36 Communication quality managing unit, 37 Switchover notifying unit, 38 Switching unit, 39 Switchover table storing unit, 40 Communication level managing unit, 41 Terminal model identifying unit, 81 Multi-antenna received signal processing unit, 82 First coupler/distributor, 83 Second coupler/distributor.

The invention claimed is:

1. A communication apparatus comprising:
    a plurality of antennas;
    a quality managing unit for acquiring or calculating a communication quality of a received signal at a different counterpart communication apparatus;
    an identifying unit for identifying a model of the different counterpart communication apparatus;
    a storing unit for storing a plurality of tables, wherein each of the plurality of tables corresponds to a different one of a plurality of models of communication apparatuses, and wherein each of the plurality of tables identifies a communication quality corresponding to a requirement for switchover of a communication mode for the corresponding one of the plurality of models;

a switching unit that
identifies one of the plurality of tables corresponding to the identified model of the different counterpart communication apparatus, and
sets a communication mode, for a transmitting signal to the different counterpart communication apparatus, from among a non-spatial multiplexing mode and a spatial multiplexing mode, based on a communication quality identified in the identified table corresponding to the identified model of the different counterpart communication apparatus; and a transmitting unit for processing the transmitting signal to output the processed signal to said plurality of antennas on the basis of said set communication mode.

2. The communication apparatus according to claim 1, wherein said switching unit does not switch the setting of the communication mode for said transmitting signal from said non-spatial multiplexing mode to said spatial multiplexing mode with regard to a different communication apparatus which does not fit into one of the plurality of models.

3. The communication apparatus according to claim 1, wherein said identifying unit identifies the model of said different communication apparatus on the basis of part of bits out of a plurality of bits constituting an ID to be transmitted from said different communication apparatus.

4. The communication apparatus according to claim 1, wherein said communication apparatus is in conformity with WiMAX standards, said non-spatial multiplexing mode is DL MIMO MATRIX-A, and said spatial multiplexing mode is DL MIMO MATRIX-B.

5. The communication apparatus according to claim 1, wherein each of the plurality of tables associates a first communication quality with the non-spatial multiplexing mode and a second communication quality with the spatial multiplexing mode.

6. The communication apparatus according to claim 1, wherein each of the non-spatial multiplexing mode and the spatial multiplexing mode comprise a plurality of communication levels, and wherein the plurality of tables associate each of the plurality of communication levels for both the non-spatial multiplexing mode and the spatial multiplexing mode with a communication quality.

7. A communication apparatus comprising:
a plurality of antennas;
a quality managing unit for acquiring or calculating a communication quality of a received signal at a different counterpart communication apparatus;
an identifying unit for identifying a model of the different counterpart communication apparatus;
a storing unit for storing a table, in which the communication quality corresponding to a requirement for switchover of a communication mode is set, for each model of the different counterpart communication apparatus;
a switching unit for referring to said table on the basis of said communication quality and said model of the different counterpart communication apparatus to switch a setting of a communication mode for a transmitting signal from a non-spatial multiplexing mode to a spatial multiplexing mode or from said spatial multiplexing mode to said non-spatial multiplexing mode; and
a transmitting unit for processing the transmitting signal to output the processed signal to said plurality of antennas on the basis of said set communication mode,
wherein said storing unit stores a special table for a different communication apparatus which does not fit into a predetermined model, and said switching unit refers to said special table with regard to the different communication apparatus which does not fit into the predetermined model to switch the setting of the communication mode for said transmitting signal from said non-spatial multiplexing mode to said spatial multiplexing mode or from said spatial multiplexing mode to said non-spatial multiplexing mode.

8. The communication apparatus according to claim 7, wherein said communication quality is a carrier to interference and noise ratio.

9. The communication apparatus according to claim 7, wherein said communication quality is a packet error rate.

10. A communication method for a communication apparatus including a plurality of antennas, and a storing unit for storing a plurality of tables, wherein each of the plurality of tables corresponds to a different one of a plurality of models of communication apparatuses, and wherein each of the plurality of tables identifies a communication quality corresponding to a requirement for switchover of a communication mode for the corresponding one of the plurality of models, the communication method comprising:
acquiring or calculating a communication quality of a received signal at the different counterpart communication apparatus;
identifying the model of the different counterpart communication apparatus;
identifying one of the plurality of tables corresponding to the identified model of the different counterpart communication apparatus;
setting a communication mode, for a transmitting signal to the different counterpart communication apparatus, from among a non-spatial multiplexing mode and a spatial multiplexing mode, based on a communication quality identified in the identified table corresponding to the identified model of the different counterpart communication apparatus; and
processing the transmitting signal to output the processed signal to said plurality of antennas, on the basis of said set communication mode.

* * * * *